Aug. 8, 1933.  G. H. CONNORS ET AL  1,921,250
AUTOMATIC SEMITRAILER
Filed Jan. 12, 1932    4 Sheets-Sheet 1
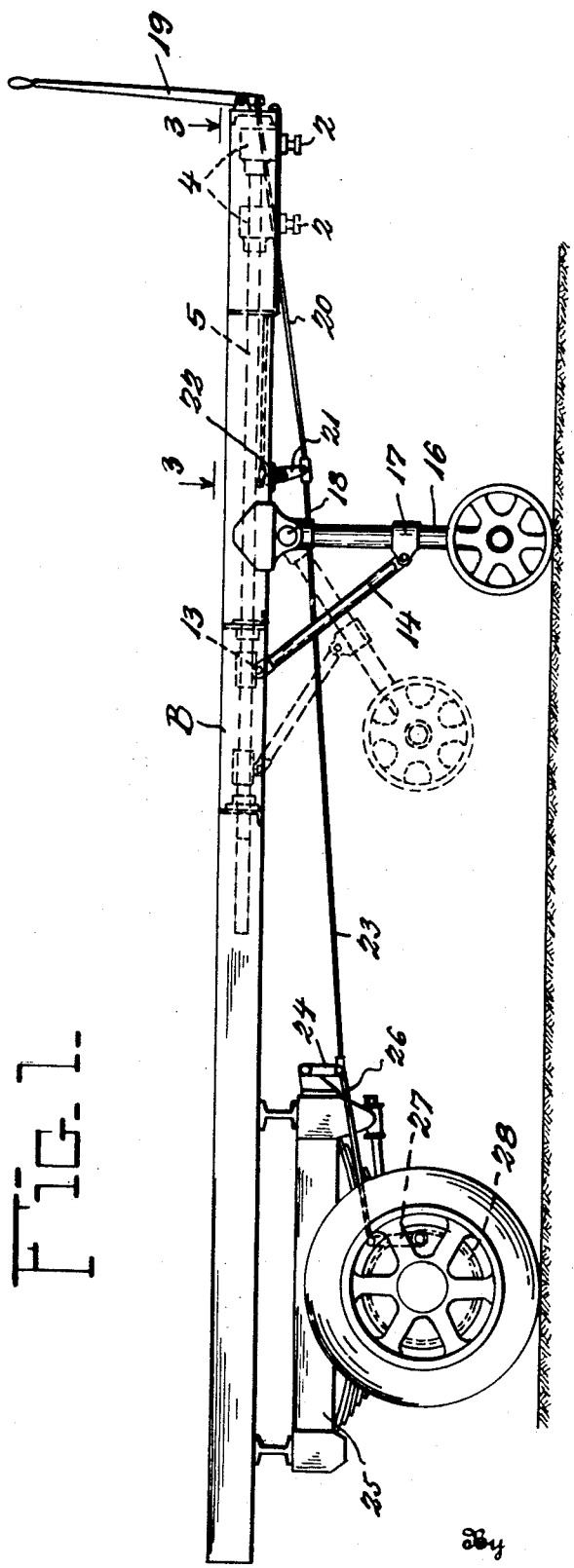
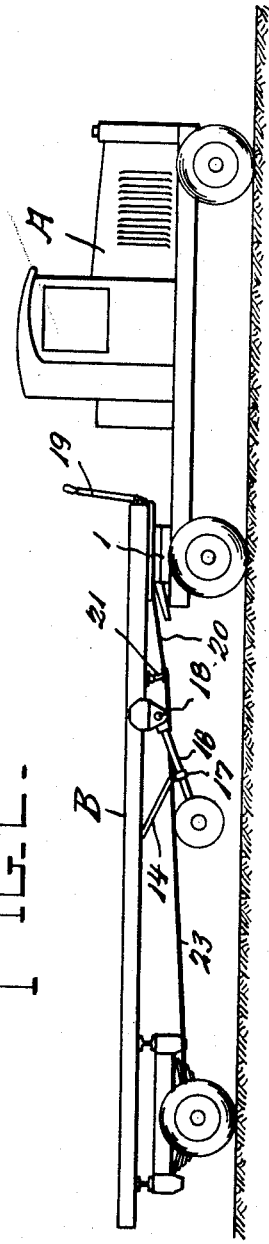
Inventor
FRED C. STIFF.
GEORGE H. CONNORS.
By Robert Robb
Attorneys

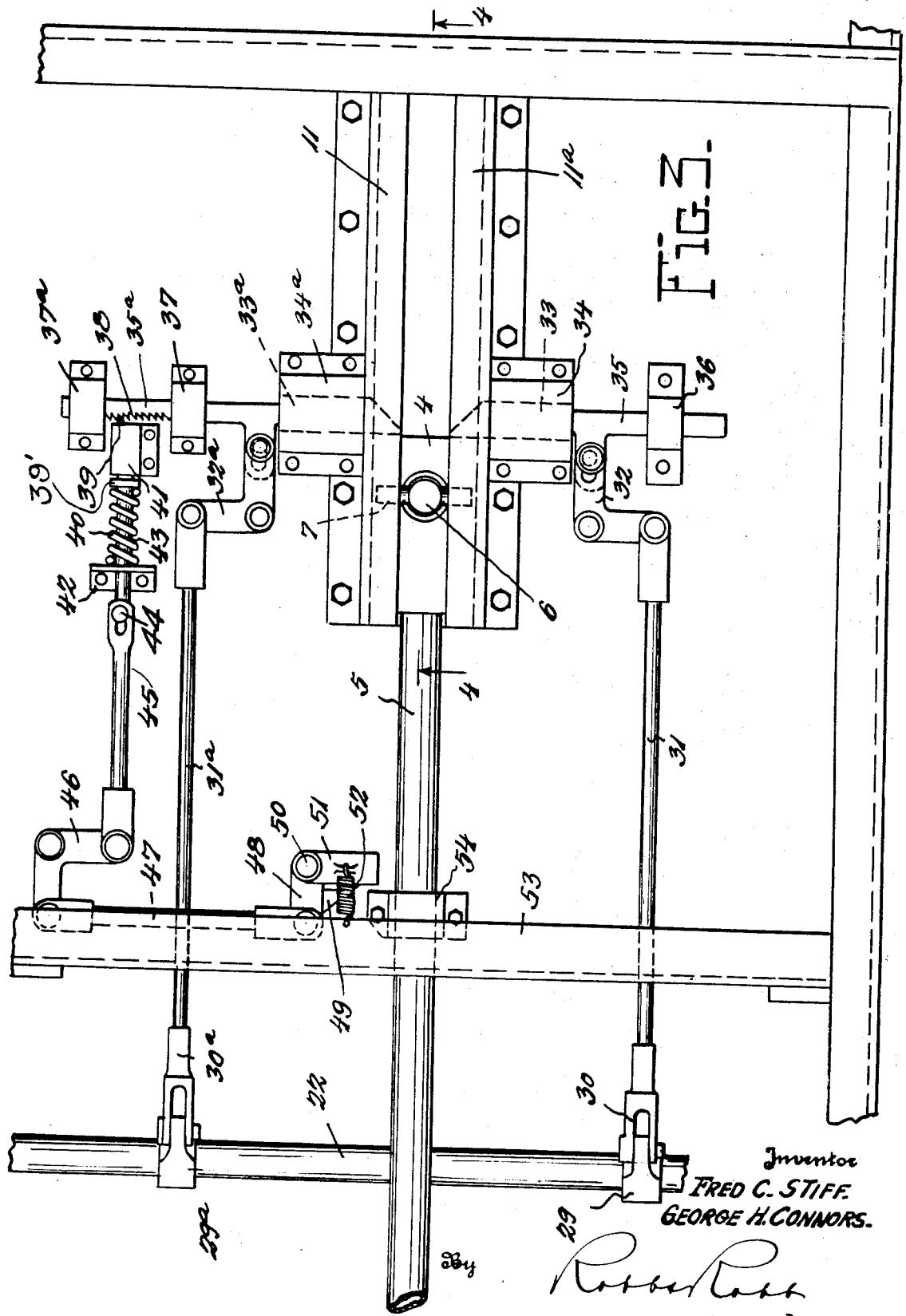

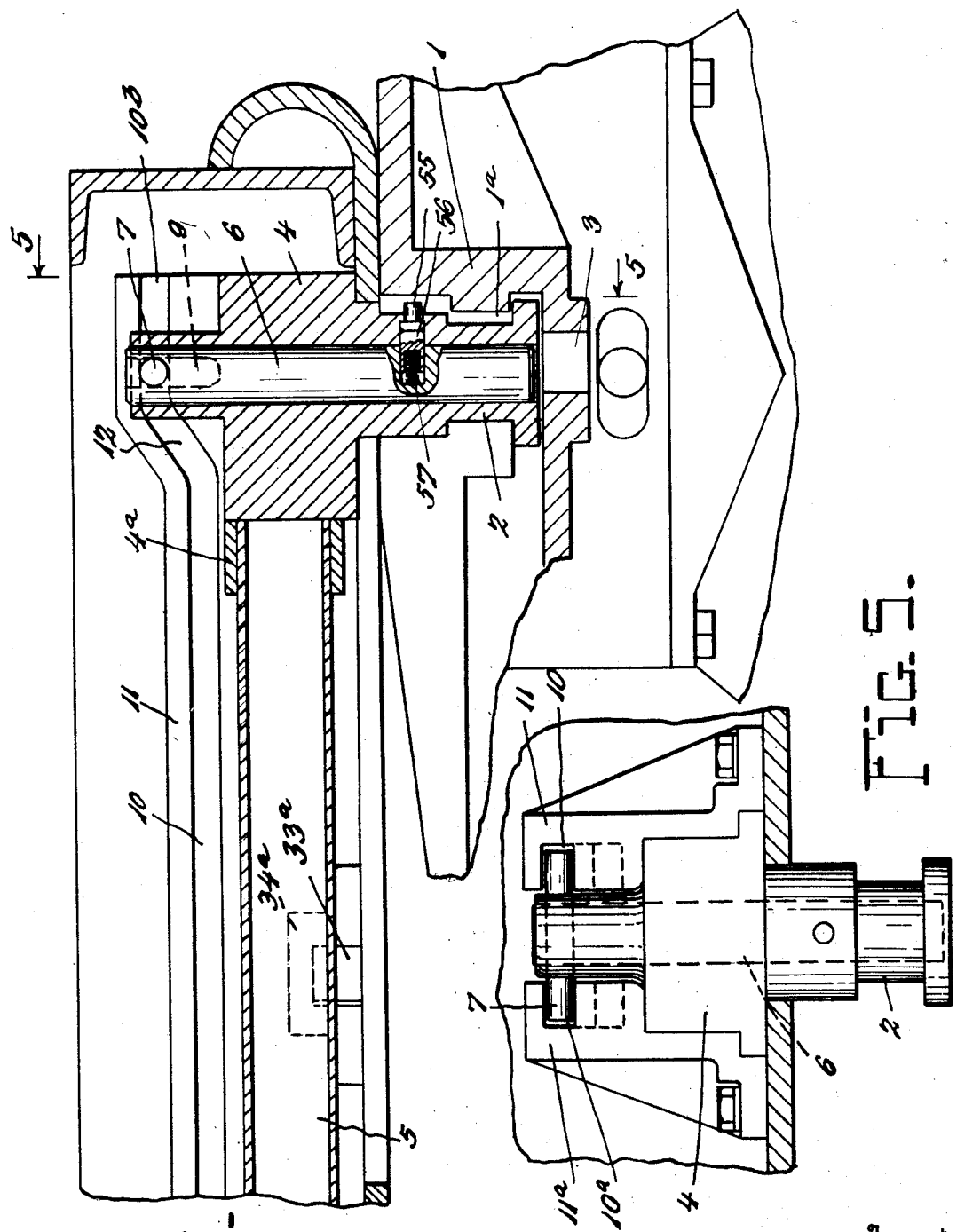

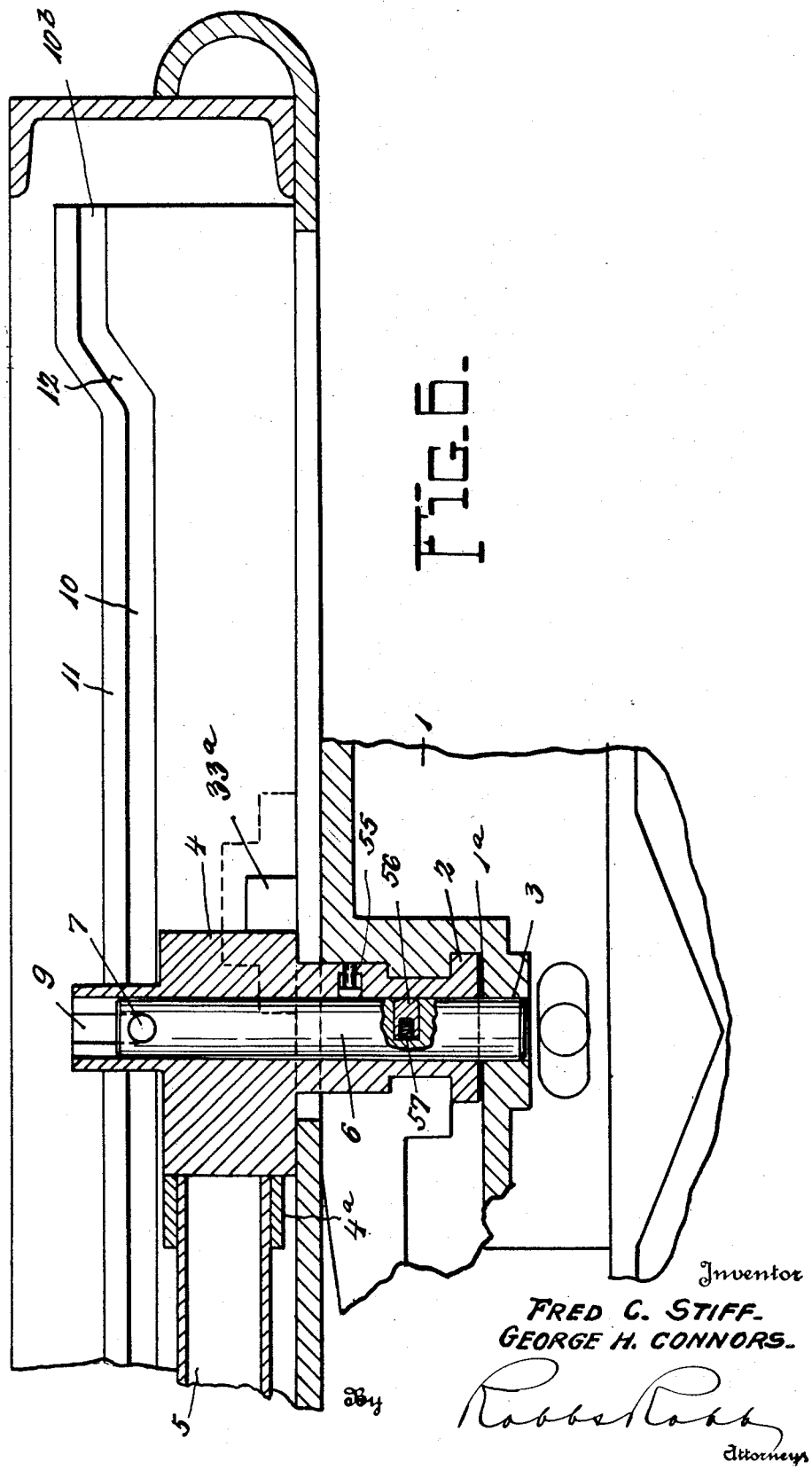

Patented Aug. 8, 1933

1,921,250

UNITED STATES PATENT OFFICE 1,921,250

AUTOMATIC SEMITRAILER

George H. Conners and Fred C. Stiff, Edgerton, Wis., assignors to Highway Trailer Company, Edgerton, Wis., a Corporation Application January 12, 1932. Serial No. 586,241

21 Claims. (Cl. 280—33.1)

The purpose of this invention has been to improve upon known types of tractor-trailer combination units at present being very largely used in the automotive vehicle art.

Since the largest number of tractor vehicles today in use for the purposes of hauling trailers are of a type utilizing what is known as a lower fifth wheel for cooperation and locking engagement with an upper fifth wheel and king pin on the trailer, one of the objectives of this invention has been to develop an improved trailer king pin mechanism for cooperation with the most generally used type of tractor vehicle and its fifth wheel.

In the type of trailer vehicle of this invention utilizing the improved king pin mechanism, it is contemplated to mount the king pin movably relatively to the trailer and utilize movement imparted to the king pin as the tractor backs into coupling relation to the trailer for accomplishing certain service operations in conjunction with mechanisms that are usually mounted upon the trailer.

Thus, in the present instance, the king pin device hereinafter set forth is adapted to work in conjunction with a supporting jack or wheeled support for the front end of the trailer, used when the trailer is uncoupled from the tractor, in such a manner as to move the jack or wheeled support into and out of operative position in relation to the ground.

Another phase of novelty of the invention involves provisions whereby the said movable king pin device is availed of as an operating means for the brake mechanism for the trailer, the latter being usually set preliminarily to uncoupling the trailer from an tractor so as to brake the rear wheels of the trailer when it is free from the tractor, or uncoupled.

Notwithstanding the employment of the special movable or slidable king pin mechanism that will be hereinafter described in detail, the said mechanism is fully adapted to be coupled with customary types of tractor lower fifth wheels at present in use, the king pin itself being designed for such purpose especially, though it is associated with other peculiar and special mechanisms that are operated by its movement for performing certain functions that have been touched upon in the foregoing statement.

The king pin is primarily carried by a slide bar and said slide bar is actuated by the actuating movement incident to contact of the lower fifth wheel of the tractor with the king pin, thus moving the jack out of and into supporting position, in accordance with the movement of the slide bar and the king pin.

Among other features of novelty, there may be mentioned the provision of a vertically movable locking pin which is mounted in the interior of the king pin, and which through its engagement with the lower fifth wheel member of the tractor, effects an automatic coupling action between the tractor and trailer during the rearward movement of the king pin and supporting member or slide bar; the instrumentalities through which this locking pin is actuated; the provision of locking instrumentalities in the locking pin for locking the king pin in its extreme forward position, together with mechanism associated with the king pin and supporting member, the locking instrumentalities being automatically releasable upon engagement by the lower fifth wheel member of the tractor, thereby permitting the aforesaid mechanism to be operated; brake mechanism and operating instrumentalities therefor; and finally there may be mentioned here a mechanism controlled by the actuation of the brakes for releasably locking the king pin in its coupling position with reference to the aforesaid fifth wheel member.

The details of the constructions above outlined, together with other novel details introduced by this invention, will be described in detail hereinafter.

In the accompanying drawings,—

Figure 1 represents a side elevation of a semi-trailer provided with the mechanism embraced in the present invention and showing, in dotted lines, the movement of the king pin, supporting member, and wheeled jack.

Figure 2 is a side elevation showing the trailer coupled to a tractor.

Figure 3 is a fragmentary plan taken along the line 3—3 of Figure 1, looking in the direction of the arrows, and showing details of the locking mechanism above generally referred to.

Figure 4 is a fragmentary sectional view taken on the line 4—4 of Figure 3, showing the construction of the king pin assembly and nature of the engagement between the king pin and lower fifth wheel member of the tractor.

Figure 5 is a fragmentary view showing a front elevation of the king pin.

Figure 6 is a view similar to Figure 4 but showing the king pin coupled to the lower fifth wheel of the tractor.

Referring more particularly to the drawings, the vehicular unit is formed of the tractor A and the semi-trailer B. The tractor may be any form of traction vehicle of standard type having a lower fifth wheel member. This lower fifth wheel member indicated at 1 serves as a complementary coupling member and has a recess 1a for receiving the king pin 2 of the trailer, and is also provided with a bottom opening 3 to receive a locking pin hereinafter to be described, by means of which the trailer and tractor are coupled. The lower fifth wheel member is generally of standard construction, and the features of novelty are in the mechanisms carried by the trailer.

The king pin 2 has an enlarged head 4, formed with an annular flange 4a, in which the sliding supporting member or bar 5 is secured. Within the king pin is mounted the vertically movable locking pin 6, provided with a cross-pin 7 moving up and down in slots 9 at the top of the king pin.

The ends of the cross pin 7 engage the slots 10 and 10a formed in the opposing spaced guide members 11 and 11a, each of which is correspondingly vertically offset, as indicated at 12, so that the forward end of the guide slot, as indicated at 10b, is in a vertically higher plane than the remaining portion 10. Since, as has been previously mentioned, the king pin 4 is movable rearwardly of the trailer under the force exerted by the engagement of the king pin 1, it will be seen that as the cross pin 7 travels in the offset portion of the guides, it will force the locking pin 6 into the opening 3 of the lower fifth wheel member, and the coupling action is effected.

The supporting member 5 is of course moved rearwardly with the movement of the king pin. Supported on the supporting member at 13 by the pivotally connected link 14, is the wheeled jack 16, which supports the trailer in a horizontal position while uncoupled from the tractor. The link 14 is connected to the jack 16 through the sleeve 17, the jack being pivoted to the frame of the trailer at 18. Therefore, as the king pin and supporting member or sliding bar 5 move rearwardly, the jack 16 is lifted to the dotted line position of Figure 1, and this lifting takes place immediately after the locking pin 6 drops into the lower fifth wheel opening 3; and upon uncoupling, the jack assumes its supporting position immediately before the locking pin 6 is moved out of its locking position in the lower fifth wheel member.

To secure the king pin firmly in its retracted or locking position, a locking mechanism is provided, the actuation of which is accomplished through the actuation of the brakes of the trailer; and because the actuation of the locking mechanism is dependent upon the actuation of the brakes, the operation of the latter will now be described. On the trailer is mounted the brake lever 19 which is connected by the rod 20 to a depending link 21 secured to a rotative shaft. The link 21 also has secured to it the rod 23, which is secured to the link 24 mounted on the subframe 25 which carries the wheels of the trailer. A rod 26 is also connected to the link 24 and to the brake actuating lever 27 which, upon proper manipulation of the lever 19, applies the brake band 28 to the wheel. It will be understood that the parts 21, 23, 24, 25, 26, 27 and 28 are duplicated on each side of the trailer.

Therefore, applying and releasing the brakes 28 causes corresponding actuation of the shaft 22. It is this shaft which actuates the locking mechanism above referred to, and which will now be described, this locking mechanism firmly securing the king pin in coupled relation with the tractor. Mounted upon the shaft 22 are the lever members 29 and 29a which work in bearings 30 and 30a of the links 31 and 31a, which are respectively operatively connected to one arm of the bell cranks 32 and 32a, the other arm of these bell cranks being operatively connected to the locking members 33 and 33a to move these parts into and away from engagement with the head 4 of the king pin 2. These locking members operate in guides 34 and 34a and are formed with rearwardly projecting extensions 35 and 35a, the extension 35 further operating in the guide 36, while the extension 35a operates in the guides 37 and 37a.

One of these extensions is provided with a series of forwardly tapering teeth forming a rack 38. This rack is engaged by the pawl 39, which, through its engagement with the rack 38, locks the locking members in retracted position, the pawl being held in engagement with the rack by the pressure of the spring 40 compressed between the flange 39' of the pawl which is slidable in the guide 41, and the fixed bracket 42, the spring 40 surrounding the shank 43 of the pawl, the end of which shank is turned to form a hook 44 to receive the slotted end of a link 45, the other end of which is connected with one arm of a bell crank 46, the other arm of which is joined to the link 47. This link 47 is also connected to the link member 48 which is formed with an abutment 49. The link 48 pivotally carries at 50, the dog 51, held normally in position by the spring 52 carried by the frame member 53. The mounting of the dog is loose, so that upon engagement therewith of the abutment member 54 carried on the sliding bar 5, the dog 51 will be forced against the abutment 49 as the abutment 54 moves in one direction as the tractor and trailer are coupled, and is forced back against the action of the spring 52 as the abutment member 54 is withdrawn, thus permitting the abutment member 54 to be withdrawn. The spring 52 then snaps the dog 51 back into its normal position.

In order to lock the mechanism in secured position when the trailer and tractor are uncoupled, it is necessary that the king pin be secured at its extreme forward position. To this end there is mounted in the locking pin 6 a lock which is formed of a lock member 56 adapted to register with a detent 55 mounted in the king pin and extending outwardly beyond the king pin surface through an opening through the king pin suitably provided therefor, the lock member 56 being pressed outwardly by the spring 57, which is positioned within the locking pin 6, the spring maintaining the detent and lock member 56 in releasable locking position while the trailer is uncoupled, thereby securing all the parts of the mechanism, and being moved out of locking position by pressure exerted by engagement with the lower fifth wheel member 1 as the tractor moves into coupling position.

The mechanism operates in the following manner.—

Assuming that the tractor and trailer are uncoupled, it will be obvious that the brakes 28 are applied, this having been done previously to the last uncoupling. The brakes are applied through the proper manipulation of the lever 19 which is connected to the rod 20, which is in turn connected to the arm or link 21, power applied to the lever being transmitted to the brakes through the rod 20, to the arm 21, thence to the rod 23, arm 24, rod 26, to the brakes.

Upon actuation of the lever 19 and arm 21, the shaft 22 will be moved so that the links 31 and 31a will be moved backwardly by the pull exerted by the levers 29 and 29a secured to the shaft 22.

This pull actuates the bell cranks 32 and 32a so that they turn on their respective fulcrums to retract the locking members 33 and 33a, the pawl 39 riding over the forwardly projecting teeth 38 as though they constituted a ratchet, until the end of the retracting movement of the locking members 35a and 35 is reached, when the pawl locks the locking members 35a and 35 into the retracted position. This means, therefore, that the shaft 22 holds the arms 21 and 24 and brake rods 23 and 26 in position to hold the brakes securely applied.

Now, as the tractor A moves to the trailer to couple therewith, the lower fifth wheel member 1 engages first the spring pressed detent 55 forcing it backwardly against the spring 57, the lock part 56 being pressed thereby backwardly to the line of cleavage between the locking pin 6 and king pin 2, the detent being flush against the king pin surface. The king pin is thus released, and further backing of the tractor moves the king pin and supporting member 5 rearwardly of the trailer and the pin 7 travelling in the guides 10 and 10a, reaches the vertically offset portions 12 and forces the locking pin 6 into the opening 3 in the fifth wheel member 1, thereby coupling the vehicles.

Immediately after the coupling action takes place, the jack 16 is raised out of its supporting position, and since the locking members 33 and 33a are withdrawn or retracted, as has already been described, there is no opposition to the head 4 of the king pin 2 passing therebetween, and as it does so, the abutment member 54 on the supporting member 5 engages the dog 51 and presses it against the abutment 49 upon which the dog 51 fulcrums, operating the link 47 and bell crank 46 to release the pawl 39 from the rack 38. Instantly the tension of the brakes 28 releases them, which immediately actuates the shaft 22 to force the locking members 33 and 33a in securing position behind the head 4 of the king pin, thus securing the king pin firmly in coupled relation with the tractor.

All this action must take place instantaneously, as the pawl 39 is out of engagement with the rack 38 only during the time of passage of the abutment 54 by the dog 52, as immediately the abutment 54 has passed (which takes only a moment) the spring 52 returns the dog 51 to its normal position, and the pawl 39 snaps back into engagement with the rack 38. The brakes are thus released. For the uncoupling operation, the brakes 28 are applied, as previously described, withdrawing the locking members 33 and 33a, also as previously described, from their engagement with the head 4 and locked in this retracted position by the pawl 39. This clears the way for the forward movement of the king pin as the tractor is driven forwardly. This forward movement of the king pin and supporting member 5 lowers the supporting jack 16 to its supporting position before the pin 7 reaches the offset guide portions 12, which lift the locking pin 7 out of engagement with the lower fifth wheel member to uncouple it; and this return of the jack 16 to supporting position before the uncoupling takes place, assures that the trailer is firmly supported before the tractor withdraws, as the vehicles are still coupled after the jack takes its supporting position and remain coupled until the pin 7 is carried up the vertically offset guide portions 12 and 12a.

As soon as the uncoupling has been effected and the tractor withdrawn, the spring 57 operates to push the detent 55 and lock bar 56 into securing position, thus securing the parts against accidental displacement, as the king pin cannot be moved rearwardly, since the pin 7 cannot pass the offset guide portions 12 while the lock part 56 is in locking position, as it prevents the locking pin 6 from dropping into position in the opening 3. In the construction described, the brakes of the trailer remain applied while the tractor is uncoupled. In the event the position of the trailer be desired to be changed, suitable means may be provided for disconnecting the brake rod 23, as will be apparent to one skilled in the art, by which means the brakes may be released without releasing the locking mechanism above described.

It will be seen, accordingly, that, except for the manual setting of the brakes preparatory to uncoupling the tractor from the trailer, the entire coupling and uncoupling operations are fully automatic and are accomplished through the operation of a simple system of interrelated elements.

Having thus described my invention, what I claim as new and desire to secure by Letters Patent of the United States, is—

1. Coupling mechanism for vehicles comprising the combination with a vehicle frame, of guideways mounted on the frame, a king pin slidably carried in the guides and movable therein responsively to engagement of a coupling member therewith, a slide bar connected with the king pin and slidable therewith, brakes for the vehicle, instrumentalities responsive to the operation of the brakes for locking the king pin in coupling position, and a supporting jack for the frame pivotally carried thereby and connected with the slide bar, the jack being movable upwardly and downwardly in response to movement of the king pin and supporting member.

2. Coupling mechanism for vehicles comprising the combination with a vehicle frame, of guideways mounted on the frame, a king pin slidably carried in the guides and movable therein responsively to engagement of a lower fifth wheel member therewith, the guides being vertically offset adjacent the front end thereof, and a locking pin mounted in the king pin in cooperative relation to the offset portion of the guides and vertically movable in the king pin as the king pin moves along the guides for coupling and uncoupling with the lower fifth wheel member.

3. Coupling mechanism for vehicles, comprising the combination with a vehicle frame, of guideways mounted on the frame, a king pin slidably carried in the guides and movable therein responsively to engagement of a lower fifth wheel member therewith, the guides being vertically offset adjacent the front end thereof, a locking pin mounted in the king pin, a pin passing through the locking pin and travelling in the guides, the locking pin being thereby vertically movable in the king pin as it travels along the offset portion of the guides for coupling and uncoupling with the lower fifth wheel member.

4. Coupling mechanism for vehicles, comprising the combination with a vehicle frame, of guideways mounted on the frame, a king pin slidably carried in the guides and movable therein responsive to engagement of a coupling member therewith, a supporting member secured to the king pin and movable therewith, brakes for the vehicle, and instrumentalities responsive to the operation of the brakes for locking the king pin in coupling position.

5. Coupling mechanism for vehicles, comprising the combination with a vehicle frame, of guideways mounted on the frame, a king pin slidably carried in the guides and movable therein responsive to engagement of a coupling member therewith, brakes for the vehicle, and a linkage system responsive to the operation of the brakes for releasably locking the king pin in coupling position.

6. Coupling mechanism for vehicles, comprising the combination with a vehicle frame, of guideways mounted on the frame, a king pin slidably carried in the guides and movable therein responsively to engagement of a lower fifth wheel member therewith, the guides being vertically offset adjacent the front end thereof, a locking pin mounted in the king pin and vertically movable therein as the king pin moves along the offset portion of the guides for coupling and uncoupling the king pin with the lower fifth wheel member, and a locking means for securing the king pin at the front end of the vehicle while the said vehicle is out of operation.

7. Coupling mechanism for vehicles, comprising the combination with a vehicle frame, of a king pin movably carried by the frame responsive to engagement of coupling means therewith, braking instrumentalities for the vehicle and mechanism operated by actuation of the braking instrumentalities for releasably locking the king pin in coupling position.

8. Coupling mechanism for vehicles, comprising the combination with a vehicle frame, of a king pin movably carried by the frame responsive to engagement of coupling means therewith, braking instrumentalities for the vehicle, and mechanism operable by release of the braking instrumentalities for locking the king pin in coupling position as it is pushed back into coupling position by the said coupling means.

9. Coupling mechanism for vehicles, comprising the combination with a vehicle frame, of a king pin movably carried by the frame responsive to engagement of coupling means therewith, braking instrumentalities for the vehicle, and mechanism operable by release of the braking instrumentalities for locking the king pin in coupling position as it is pushed back into coupling position by the said coupling means, the locking mechanism being automatically released upon application of the braking instrumentalities.

10. Coupling instrumentalities for vehicles, comprising the combination with a vehicle frame, of a king pin movably carried by the frame responsive to engagement of coupling means therewith, braking instrumentalities for the vehicle, mechanism operable by release of the braking instrumentalities for locking the king pin in coupling position as it is pushed back into coupling position by the said coupling means, the said mechanism comprising a rotatable shaft, a link interconnecting the braking instrumentalities and shaft, cooperating locking members adapted to releasably lock the king pin in coupling position, and a system of links interconnecting the said shaft and locking members, the links being operative responsively to movements of the said shaft as controlled by operation of the braking instrumentalities.

11. Coupling instrumentalities for vehicles, comprising the combination with a vehicle frame, of a king pin movably carried by the frame responsive to engagement of coupling means therewith, braking instrumentalities for the vehicle, mechanism operable by release of the braking instrumentalities for locking the king pin in coupling position as it is pushed back into coupling position by the said coupling means, the said mechanism comprising a rotatable shaft, a link interconnecting the braking instrumentalities and shaft, cooperating locking members adapted to releasably lock the king pin in coupling position, and a system of links interconnecting the said shaft and locking members responsive to movements of the said shaft as controlled by operation of the braking instrumentalities, the said mechanism also including a spring pressed pawl and a rack forming a part of at least one of the locking members to engage with the pawl to secure the locking members in retracted position while the braking instrumentalities are applied, and means for releasing the locking members for movement thereof into locking position upon release of the braking instrumentalities.

12. Coupling instrumentalities for a trailer, comprising a king pin movable longitudinally of the trailer upon engagement of a lower fifth wheel member, brake setting instrumentalities for setting the brakes of the trailer, and mechanism operable by action of the brakes for locking the king pin in coupling position, the said mechanism including a rotatable shaft interconnected with the brakes, a pair of locking members movable transversely of the trailer for engaging the king pin for locking the same in coupling position, lever instrumentalities for interconnecting the locking members with the said shaft, one of the locking members having a portion thereof formed into a rack, a pawl engaging the rack for locking the locking members, an abutment member movable with the king pin, and means operable by the abutment member for actuating the pawl, whereby actuation of the said means and pawl releases the brakes and positions the locking members in engagement with the king pin when the latter comes into coupling position with the fifth wheel member.

13. Coupling mechanism for vehicles, comprising the combination with a vehicle frame, of a king pin slidably mounted on the frame, a locking pin mounted interiorly of the king pin, and operative under influence of movements of the king pin, and a locking device for preventing accidental movement of the king pin, the locking device comprising a lock bar resiliently mounted in the locking pin, and a detent mounted in the king pin and adapted to engage with the lock bar when the latter is in locking position, the said lock bar being adapted to be yieldably pressed into the king pin in engagement with the detent.

14. Coupling mechanism for vehicles, comprising the combination, with a vehicle frame, of guideways mounted on the frame, a king pin slidably carried in the guides and automatically movable therein from inoperative to operative positions responsively to engagement of a coupling member therewith, and a supporting jack for the vehicle frame pivotally carried thereby, and operated by movement of the king pin through a predetermined distance during coupling and uncoupling movements of the vehicles.

15. Coupling mechanism for vehicles comprising the combination with a trailer frame of a king pin movably mounted thereon for coupling the trailer to a tractor, the king pin including a locking pin, mounting means for the locking pin automatically operable during coupling and uncoupling movements between the vehicles for correspondingly automatically moving the said locking pin incidentally to such movements, and a wheel support for the front end of the trailer operable by movement of the king pin as the king pin is moved through a predetermined distance.

16. A trailer comprising a vehicle frame, a king pin movably mounted thereon for coupling the trailer to a tractor and movable in the coupling operation, the king pin including a locking pin mounting means for the locking pin enabling the locking pin to automatically move incidentally to coupling and uncoupling movements between the trailer and tractor, and brake mechanism operable by movement of the king pin as the king pin is moved through a predetermined distance incident to coupling of the trailer and tractor.

17. In coupling mechanism for vehicles, the combination with a vehicle frame, of a king pin adapted to be engaged with a fifth wheel on a tractor and movable longitudinally of the said frame incident to relative movement of the vehicles in coupling and uncoupling of the vehicles, said king serving to perform service operations in such movement, instrumentalities for guiding said king pin in its longitudinal movements aforesaid, and locking instrumentalities for the king pin including parts automatically movable into the path of movement of the king pin and serving to lock said king pin at the end of its movement in one direction.

18. In coupling mechanism for vehicles, the combination with a vehicle frame, of a king pin adapted to be engaged with a fifth wheel on a tractor and movable longitudinally of the said frame incident to relative movement of the vehicles in coupling and uncoupling of the vehicles, said king pin serving to perform service operations in such movement, instrumentalities for guiding said king pin in its longitudinal movements aforesaid, and locking instrumentalities for the king pin serving to lock said king pin at the end of its movement in one direction, said last mentioned instrumentalities including a locking pin movably mounted within said king pin and projectable from and withdrawable into said king pin to respectively couple and uncouple the king pin relatively to the tractor fifth wheel, means for effecting such projecting and withdrawing movements, and means for retaining said locking pin in withdrawn position and effecting locking of said king pin at the end of its movement aforesaid.

19. In coupling mechanism for vehicles, the combination with a vehicle frame, of a king pin adapted to be engaged with a fifth wheel on a tractor and movable longitudinally of the said frame incident to relative movement of the vehicles in coupling and uncoupling of the vehicles, said king pin serving to perform service operations in such movement, instrumentalities for guiding said king pin in its longitudinal movements aforesaid, and locking instrumentalities for the king pin including parts automatically movable into the path of movement of the king pin and serving to lock said king pin at the end of its movement in one direction, said last mentioned instrumentalities including a locking pin movably mounted within said king pin and automatically projectable from and withdrawable into said king pin to respectively couple and uncouple the king pin relatively to the tractor fifth wheel, means for effecting such projecting and withdrawing movements, and releasable means positioned for engagement with the tractor fifth wheel in coupling the vehicles and serving to retain said locking pin in withdrawn position when the vehicles are uncoupled and to enable the locking pin to be projected when the vehicles are in position to couple the king pin to the tractor fifth wheel.

20. In coupling mechanism for vehicles, the combination with a vehicle frame, of a king pin adapted to be engaged with a fifth wheel on a tractor and movable longitudinally of the said frame incident to relative movement of the vehicles in coupling and uncoupling of the vehicles, said king pin serving to perform service operations in such movement, a locking member automatically movable into the path of movement of the king pin upon the latter reaching the end of its movement in coupling the vehicles, and serving to lock said king pin at the end of its movement, a locking pin movably mounted within the king pin and projectable from and withdrawable into said king pin relatively to the tractor fifth wheel, instrumentalities for effecting such projecting and withdrawing movements of the locking pin and comprising a projection carried by said locking pin and a guide on the vehicle frame cooperatively engageable with said locking pin projection and having an offset, and automatically releasable means positioned for engagement with the tractor fifth wheel in coupling the vehicles and serving to retain said locking pin in withdrawn position and to lock said king pin at the end of its movement in uncoupling the vehicles.

21. In coupling mechanism for vehicles, the combination with a vehicle frame, of a king pin adapted to be engaged with a fifth wheel on a tractor and movable longitudinally of the said frame incident to relative movement of the vehicles in coupling and uncoupling of the vehicles, said king pin serving to perform service operations in such movement, a locking member automatically movable into the path of movement of the king pin upon the latter reaching the end of its movement in coupling the vehicles, and serving to lock said king pin at the end of its movement, a locking pin movably mounted within the king pin and projectable from and withdrawable into said king pin relatively to the tractor fifth wheel, instrumentalities for effecting such projecting and withdrawing movements of the locking pin and comprising a projection carried by said locking pin and a guide on the vehicle frame cooperatively engageable with said locking pin projection and having an offset, and automatically releasable means positioned for engagement with the tractor fifth wheel in coupling the vehicles and serving to retain said locking pin in withdrawn position and to lock said king pin at the end of its movement in uncoupling the vehicles, said releasable means comprising a two-part locking member, one part of which is carried in the king pin and normally projects therefrom for engagement with the tractor fifth wheel and the other part carried in the locking pin, said parts being positioned to assume a registered alignment when the locking pin is withdraw into the king pin, and a spring for projecting said king pin part and projecting said locking pin part to cause the latter to assume a position partly in the king pin and partly in the locking pin when the locking pin is in such withdrawn position, said spring being yieldable to enable movement of the parts of the locking member to present the line of cleavage of the locking member parts coincident to the line of cleavage of the king pin part with the tractor fifth wheel in coupling the vehicles, thereby releasing the locking pin and king pin for movements, as aforesaid.

GEORGE H. CONNORS.
FRED C. STIFF.